United States Patent
Chun et al.

[11] Patent Number: 6,063,420
[45] Date of Patent: May 16, 2000

[54] METHOD FOR CONTROLLING OPERATION OF KIMCHI REFRIGERATOR

[75] Inventors: Hak Gyu Chun, Chunan-shi; Young Kil Lee, Asan-shi, both of Rep. of Korea

[73] Assignee: Mando Machinery Corp., Kunpo, Rep. of Korea

[21] Appl. No.: 09/066,050

[22] Filed: Apr. 27, 1998

[30] Foreign Application Priority Data

Feb. 16, 1998 [KR] Rep. of Korea .......................... 98-4659
Feb. 16, 1998 [KR] Rep. of Korea .......................... 98-4660

[51] Int. Cl.[7] ....................................................... A23L 3/00
[52] U.S. Cl. .............................. 426/231; 426/49; 426/615
[58] Field of Search .................................... 426/231, 615, 426/270, 49, 650; 99/486

[56] References Cited

U.S. PATENT DOCUMENTS

| | | | |
|---|---|---|---|
| 5,388,427 | 2/1995 | Lee | 62/441 |
| 5,498,430 | 3/1996 | Woo | 426/231 |
| 5,536,515 | 7/1996 | Woo | 426/231 |
| 5,546,759 | 8/1996 | Lee | 62/441 |
| 5,555,797 | 9/1996 | Chun | 99/486 |

*Primary Examiner*—George C. Yeung
*Attorney, Agent, or Firm*—Oliff & Berridge, PLC

[57] ABSTRACT

A method controls the operation of a refrigerator having plural chambers sharing a compressor, each chamber including system loads constituted by a heater and refrigeration cycling apparatus composed of the compressor, an evaporator and a solenoid valve, and containing kimchi to be fermented and stored. The method includes steps of reading a user programming signal input via a key inputting portion, the user programming signal representing any one of at least two predetermined temperature regions for any one chamber and a kimchi type and taste, to determine a matrix combination; determining a total fermentation time including a lactobacillus increasing time period and a lactobacillus reducing time period corresponding to the temperature region of the determined matrix combination; determining a fixed time and a changeable setting time for controlling a fermentation operation selectively performed by a heating routine and a cooling routine in any one chamber by the heater and the refrigeration cycling apparatus, respectively, the changeable setting time including a suspending time; selecting either one of the heating and cooling routines according to a chamber temperature state by sampling the evaporator temperature; controlling the operation of the system loads based on the selected routine throughout the total fermentation time, to ferment the contained kimchi according to the matrix combination; and storing the fermented kimchi after the suspending period has elapsed, by restarting the system loads constituted by the refrigeration cycling apparatus.

9 Claims, 9 Drawing Sheets

METHOD FOR CONTROLLING OPERATION OF KIMCHI REFRIGERATOR

BACKGROUND OF THE INVENTION

1. Field of the Invention

The present invention relates to a method for controlling the operation of a kimchi refrigerator having plural chambers, and more particularly, to a method for controlling the operation of loads provided corresponding to the chambers, for the fermentation and storing of kimchi.

2. Discussion of the Related Art

Korean Patent Application No. 97-60308 filed on Nov. 15, 1997 relates to a method for fermenting and storing kimchi and includes steps of setting upper and lower fermentation temperature ranges and a separate storing temperature range, setting maximum and minimum temperatures based on the seasonal temperature of the natural environment, setting a fermentation taste, and controlling more than one load corresponding to each chamber. The various loads are devices for heating and/or cooling operations within the maximum or minimum temperature ranges, adapted to a given pickled vegetable. This technology for selectively controlling the operation of such loads, for example, heaters, compressors and the like, are dependent on the chamber temperature which is detected by a sensor. When the chamber temperature exceeds 25° C. within a higher temperature range of 21° C. to 25° C., the heater is deactivated. After a predetermined delay time, the chamber temperature is sensed again, and if the detected temperature exceeds 25° C., the compressor is activated. On the other hand, the heater is activated when the chamber temperature falls below 21° C. Such an operating control of loads is based on the heating and cooling routines of a system program. Similarly, the loads alternately perform the heating routine and the cooling routine by comparing the chamber temperature within a lower temperature region of 6° C. to 11° C. or a storing temperature region of −1° C. to 3° C.

However, the above-described prior patent application applies to a refrigerator with only one chamber for curing and storing kimchi. In this case, the problem of system overload due to sudden fluctuations while the system is in operation can occur, thereby causing system malfunction. In particular, the system experiences a malfunction contributed to mechanism properties upon the change-over between the operations of the heater and a refrigeration cycle.

Furthermore, the refrigerator system having plural chambers, while operating in the higher temperature region, needs the operation of the compressor to regulate the temperature in one chamber within the storing temperature region of −1° C. to 3° C. during the operating of the system within a higher temperature region. At the same time, if the compressor is operating for another chamber, a corresponding evaporator is operated, causing the compressor to overload temporally and thereby causing system malfunction. When this occurs, the fermentation process is abruptly interrupted, which can adversely effect the taste of the kimchi. In other words, when the fermentation process is abruptly halted, the freshness of the kimchi deteriorates.

Meanwhile, the taste of the kimchi depends in the type thereof selected, which varies over a greatly diverse selection of kimchi types. Therefore, a refrigerator including plural fermentation chambers could process different types of kimchi and process according to different tastes.

Accordingly, to adapt the above-described method to a refrigerator including a plurality of chambers for processing kimchi, each having a heater and a refrigeration cycling means, Korean Patent Application No. 94-35246 filed on Dec. 20, 1994 discloses a refrigerating cycle including two evaporators with respect to one compressor and electronic solenoid valves individually connected thereto. It should be noted that if one compressor is provided with two evaporators, the number of evaporators may be increased according to the capacity of the compressor.

The construction of a refrigerator including a plurality of chambers using a single refrigerating cycle can achieve better reliability and diversification of the product. Therefore, it is desirable that a load operation control method of the first-mentioned patent application is applied to a refrigerator including a plurality of chambers.

SUMMARY OF THE INVENTION

Accordingly, it is an object of the present invention to provide a method for controlling the operation of a refrigerator including plural chambers for fermenting kimchi, in which the refrigerator comprises a plurality of loads such as heaters, compressors and evaporators, during a predetermined fermentation period.

A further object of the present invention is to provide a method for controlling the operation of a refrigerator including a plurality of chambers for fermenting kimchi, so that the operation of loads related to any chamber for a fermentation and storing of kimchi is controlled, respectively.

Another object of the present invention is to provide a method for controlling the operation of a refrigerator including a plurality of chambers for fermenting kimchi, so that the operation of loads related to any chamber for a fermentation and storing of kimchi is controlled, respectively, under the operation of a heating routine or a cooling routine.

Still another object of the present invention is to provide a method for controlling the operation of a refrigerator including a plurality of chambers for fermenting kimchi, so that the total fermentation time set for fermenting in each chamber has a fermentation suspending period for controlling the operation of fermentation system loads for all chambers.

Still another object of the present invention is to provide a method for controlling the operation of a refrigerator including a plurality of chambers for fermenting kimchi, so that the operation of fermentation system loads is suspended during the fermentation period, to gradually halt the fermentation.

Still another object of the present invention is to provide a method for controlling the operation of a refrigerator including a plurality of chambers for fermenting kimchi, so that setting the fermentation suspending period prevents the overload of other fermentation systems of a multiple-chamber system for the fermentation and storage of kimchi.

According to the present invention, a method for controlling the operation of a refrigerator including plural chambers for the fermentation of various types of kimchi and achieving distinctive kimchi tastes comprises the following steps: reading a user programming signal input via a key inputting portion, the user programming signal representing any one of at least two predetermined temperature regions for any one chamber and a kimchi type and taste, to determine a matrix combination; determining a total fermentation time including a lactobacillus increasing time period and a lactobacillus reducing time period corresponding to the temperature region of the determined matrix combination; determining a fixed time and a changeable setting time for controlling a fermentation operation selectively performed by a heating routine and a cooling routine in any one chamber by the heater and the refrigeration cycling means, respectively, the changeable setting time including a suspending times; selecting either one of the heating and cooling routines according to a chamber temperature state determined by sampling the evaporator temperature; controlling the operation of the system loads based on the selected routine throughout the total fermentation time, to ferment the contained kimchi according to the matrix combination; and storing the fermented kimchi after the suspending period has elapsed, by restarting the system loads constituted by the refrigeration cycling means.

The suspending time of the changeable setting time allows the chamber temperature to reach a storing temperature region. The suspending time is at least five hours for a chamber temperature at a higher temperature region and at least two hours for a chamber temperature at a lower temperature region.

The heating routine for controlling the operation of loads corresponding to a given chamber includes steps of activating the heater at the lowest temperature of the any one of at least two predetermined fermentation temperature regions; deactivating the heater at the highest temperature of the any one of at least two predetermined fermentation regions; delaying the operating of the loads for a predetermined time period when the chamber temperature reaches the highest temperature and subsequently confirming the stopping of the compressor; and closing the solenoid valve connected to the evaporator and ending the heating routine for the corresponding chamber after a delay setting time period expires.

The cooling routine for controlling the operation of loads corresponding to a given chamber includes steps of deactivating the heater; activating the compressor at the highest temperature of the any one of at least two fermentation temperature regions; opening the solenoid valve connected to the evaporator; deactivating the compressor and closing the solenoid valve connected to the evaporator for a delay setting time period, when the chamber temperature reaches the lowest temperature of the any one of at least two fermentation temperature regions; and ending the cooling routine after the delay setting time period expires.

The method of the present invention controlling the operation of a refrigerator including plural chambers, which enables a heating or cooling routine to perform alternately a heating and refrigerating cycle, including a compressor and evaporators selectively activated by the operation of a solenoid valve for each chamber.

Also, the present invention preserves the taste of kimchi due to slowed fermentation for the suspending period.

BRIEF DESCRIPTION OF THE DRAWINGS

These and other aspects of the present invention in accordance with its principles now will be clarified with respect to the accompanying drawings, in which.

DETAILED DESCRIPTION OF PREFERRED EMBODIMENTS

The present invention is adapted to a refrigerator including plural chambers, each having the necessary components of a refrigerating cycle, i.e., an evaporator and the system compressor, which may be commonly shared by all chambers. That is, the system adopting the method of the present invention may have any number of chambers, corresponding to a variety of different kimchi types and/or tastes, even though the embodiment described herein has only two such chambers. Thus, the multiple-chamber kimchi refrigerator adopting the present invention comprises a compressor, two evaporators connected to the compressor, and respective electronic solenoid valves directly connected to each evaporator collectively referred to as "loads" herein, are provided to form a chamber temperature sensor.

Figure 1:
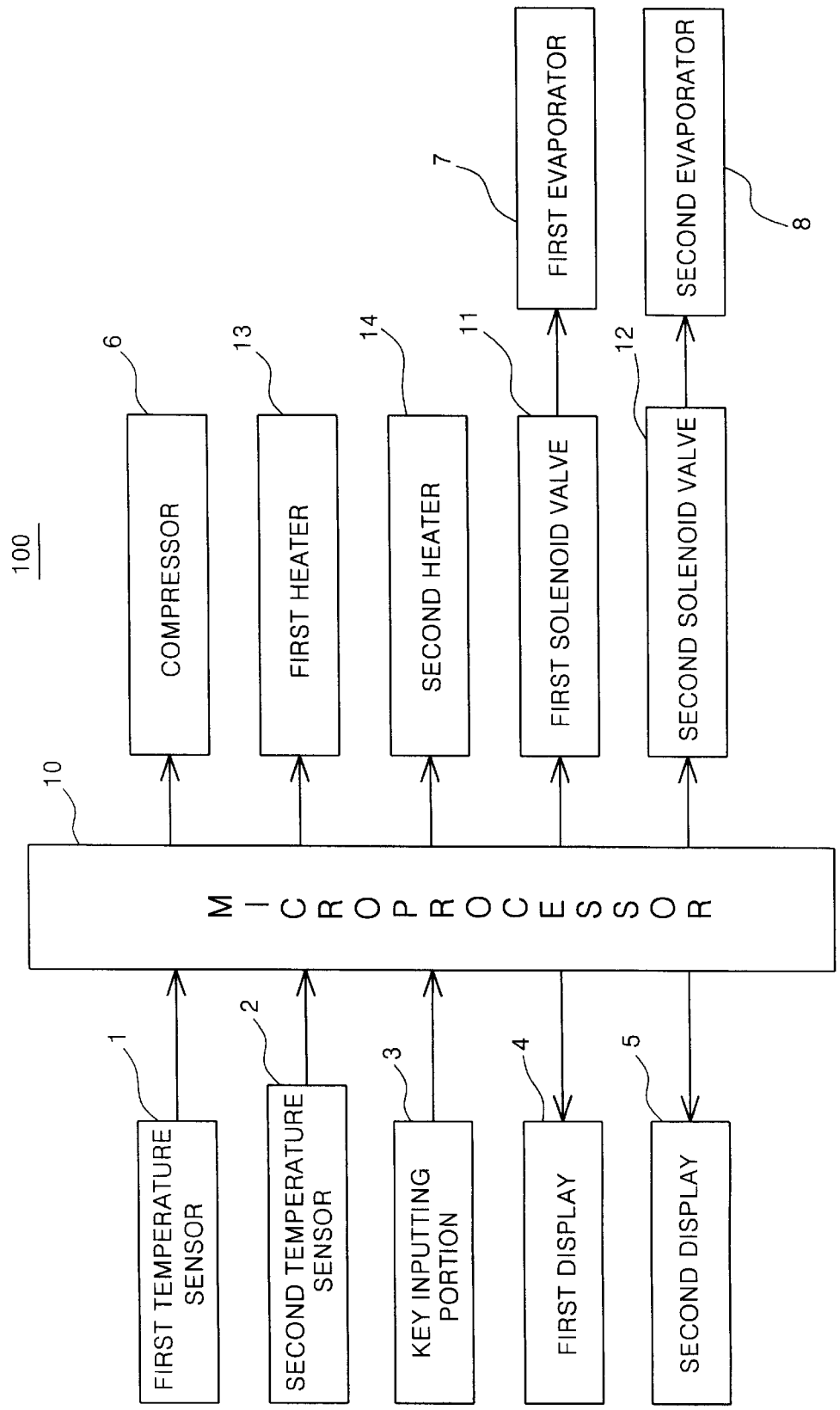
FIG. 1 is a schematic block diagram illustrating a control portion of a kimchi refrigerator including plural chambers according to the present invention.

Referring to FIG. 1, a control portion 100 for controlling the fermenting and storing temperature of a pair of chambers (not shown) comprises a microprocessor 10 that receives a programming signal from a user and, according to its system programming, controls the operation of various loads. The microprocessor 10 is connected to first and second temperature sensors 1 and 2 to detect the respective temperatures of the chambers, and a key inputting portion 3 provided with a plurality of keys or buttons, and scans the output of the key inputting portion to determine the operational mode of the system. The microprocessor 10 drives a first display 4 to display the operating state of the system and a second display 5 to display the current temperatures in the chambers.

After determining the operation mode of the system, the microprocessor 10 controls the operation of the loads. The compressor 6 of the refrigerating cycle is connected in parallel to first and second evaporators 7 and 8. First and second solenoid valves 11 and 12 respectively connected to the evaporators 7 and 8 are controlled by the microprocessor 10, which also controls first and second heaters 13 and 14 to adjust chamber temperature.

The refrigerator adopting the control method of the present invention has a plurality of temperature control regions and selects the fermentation time based on kimchi type and taste, in addition to controlling the chamber temperatures within a predetermined temperature range.

The control portion 100 establishes the set temperature regions for high-temperature fermentation, low-temperature fermentation, lactobacillus fermentation, and storing. The high-temperature fermentation region is in the range of 21° C. to 25° C., the low-temperature fermentation region is in the range of 5° C. to 11° C., the lactobacillus fermentation temperature region is in the range of 40° C. to 42° C., and the storing temperature region is in the range of −1° C. to 3° C.

The total fermentation time is based on a matrix combination, i.e., the user programming signal, which determines kimchi type and taste and is pre-stored in a system memory (not shown). Therefore, the total fermentation time is a fixed time period determined by the matrix combination, which allows kimchi loaded in a chamber to complete fermentation and then be stored therein.

Figure 4:
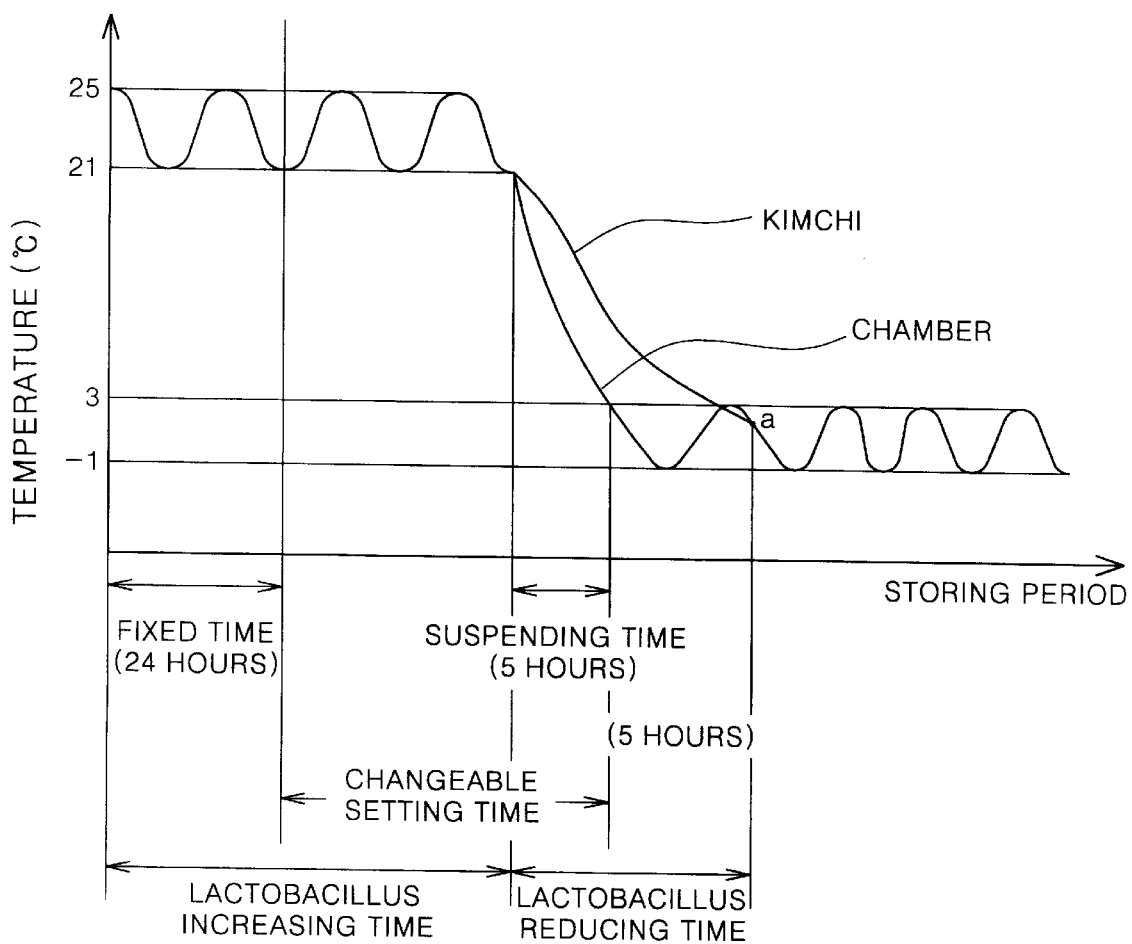
FIG. 4 is a graph illustrating the operation of loads corresponding to one chamber for fermenting kimchi at a higher temperature region according to the present invention; and, FIG. 5 is a graph illustrating the operation of loads corresponding to one chamber for fermenting kimchi at a lower temperature region according to the present invention.
Figure 5:
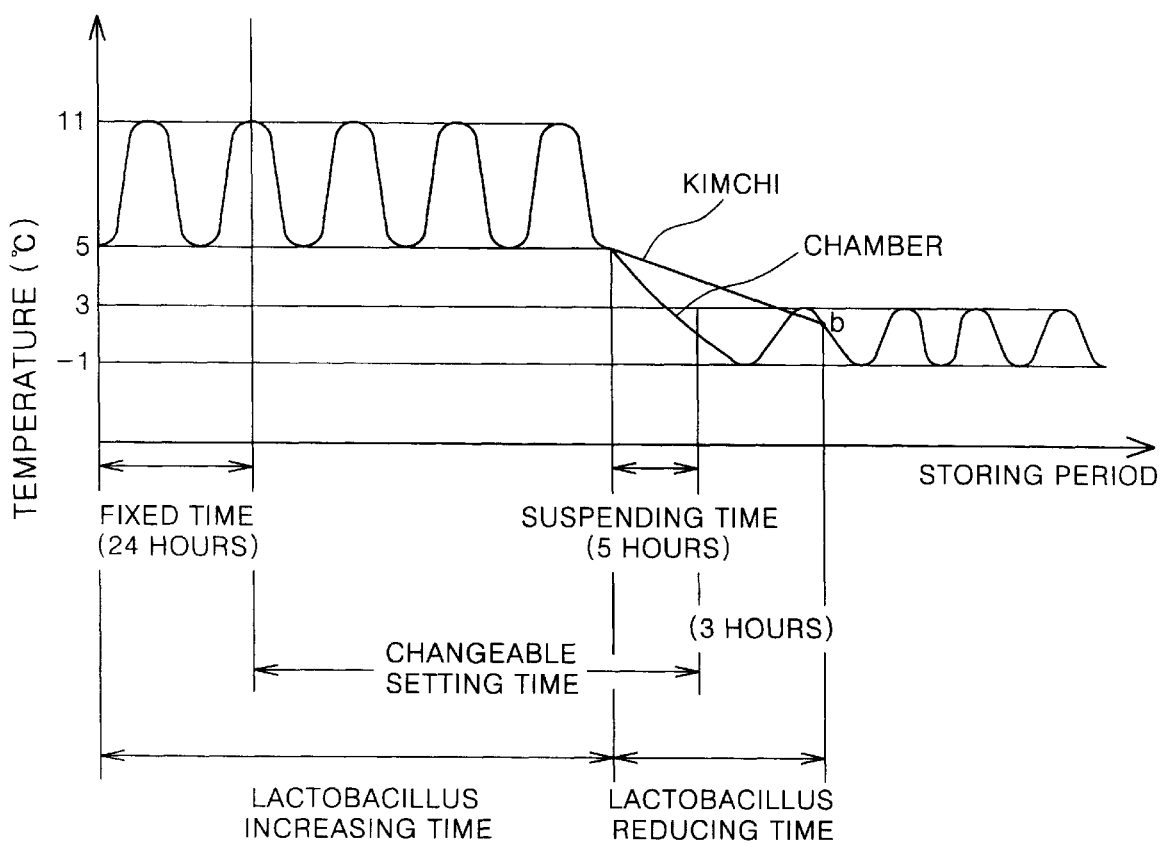

Referring to FIGS. 4 and 5, the total fermentation time is divided into a fixed time and a changeable setting time, either in the high-temperature fermentation region or the low-temperature fermentation region. The total fermentation time includes a suspending time to reduce the time required for kimchi fermentation.

As shown in FIG. 4, the kimchi fermentation method controls the operation of loads, to maintain the temperature of a chamber between 21° C. and 25° C., i.e., the high-temperature fermentation region. At that time, the loads provided in one chamber operate for the fixed time of 24 hours, followed by an additional period of operation equal to the changeable setting time less the five-hour suspending time. The loads are then deactivated (suspended) for the suspending time period. During the suspending time, load operation is interrupted. Thereafter, the temperature of the chamber is held within the range of the storing temperature of −1° C. to 3° C., accompanied by a reinstated operation of the loads. The change of the fermentation temperature is achieved through an additional delay time of the lactobacillus reducing time, equal to approximately five hours beyond the completion of the suspending time, so that the chamber temperature corresponds to the kimchi temperature at point a.

As shown in FIG. 5, the kimchi fermentation method controls the operation of loads, to maintain the temperature of a chamber between 5° C. and 11° C., i.e., the low-temperature fermentation region. Here, the loads provided in one chamber operate for the fixed time of 24 hours, followed by an additional period of operation equal to the changeable setting time less the two-hour suspending time. The loads are then deactivated (suspended) for the suspending time period. During the suspending time, load operation is interrupted. Thereafter, the temperature of the chamber is held within the range of the storing temperature of −1° C. to 3° C., accompanied by a reinstated operation of the loads. The change of the fermentation temperature is achieved through an additional delay time of the lactobacillus reducing time, equal to approximately three hours beyond the completion of the suspending time, so that the chamber temperature corresponds to the kimchi temperature at point b.

Also, kimchi stored at a temperature between −1° C. and 3° C. can be further fermented depending on consumer preference. If additional fermentation is selected, the system adopting the present invention can perform the high-temperature on low-temperature fermentation. Further, the present invention has the capacity of selecting high-temperature or low-temperature fermentation for a variety of kimchi types, including cabbage kimchi, water kimchi, radish kimchi, and other seasonal and fermented foodstuffs, as well as producing kimchi having several degrees of fermentation.

Therefore, the present invention can adjust the temperatures of two chambers or more, respectively, so that the operation of a heater and a compressor in each chamber is controlled by heating and cooling routines, as described below.

The control portion 100 operates according to the heating and cooling routines in addition to the determination of the fermenting and storing times based on the matrix combination of kimchi type and taste. Thus, the control portion 100 controls the operation of loads for the fermenting and storing of kimchi in each chamber, so that the kimchi is fermented and then stored according to a detected chamber temperature.

Figure 2A:
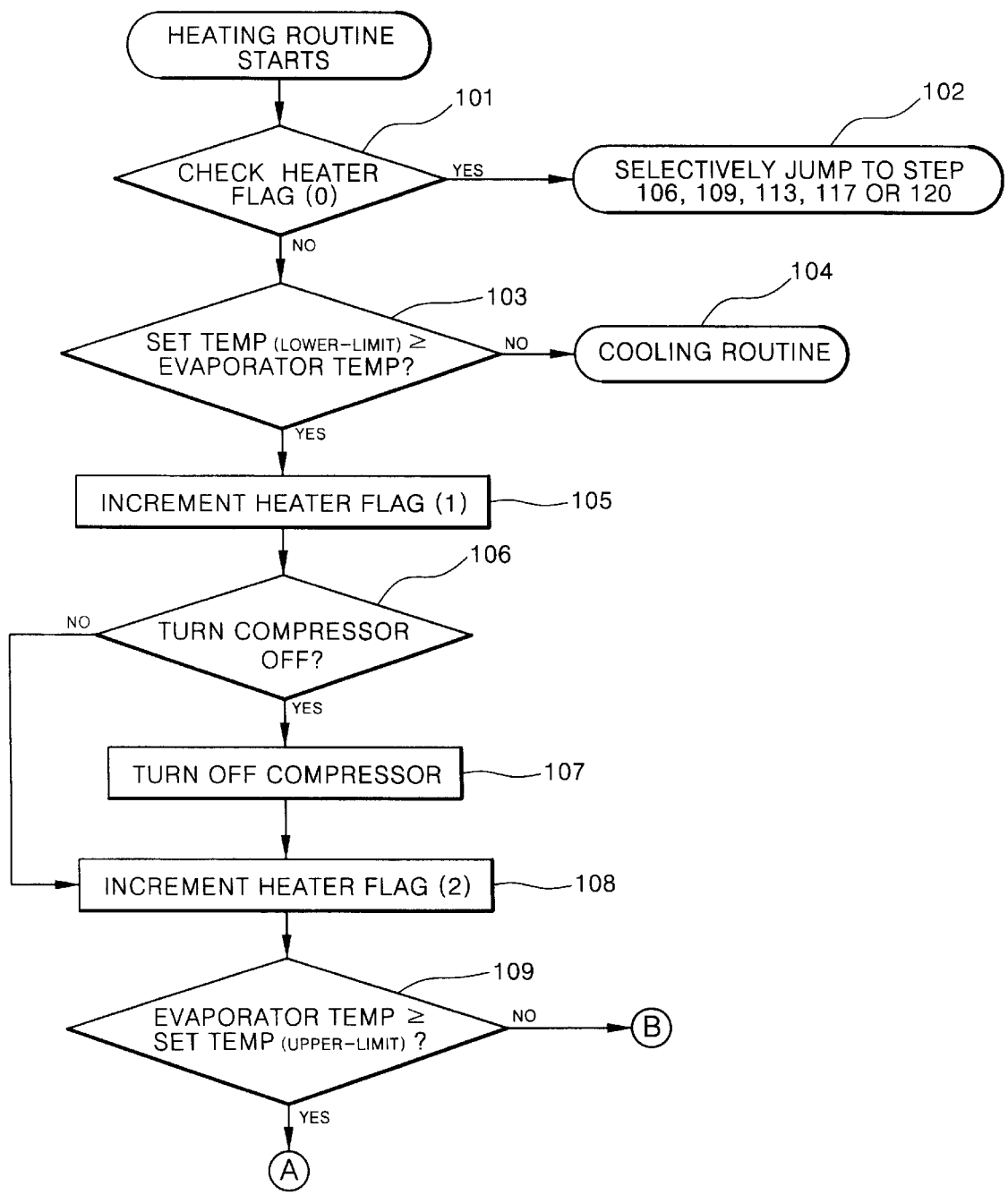
FIG. 2 is a flow chart illustrating a heating control operation of the control portion corresponding to one chamber for fermenting and storing kimchi according to the present invention.
Figure 2B:
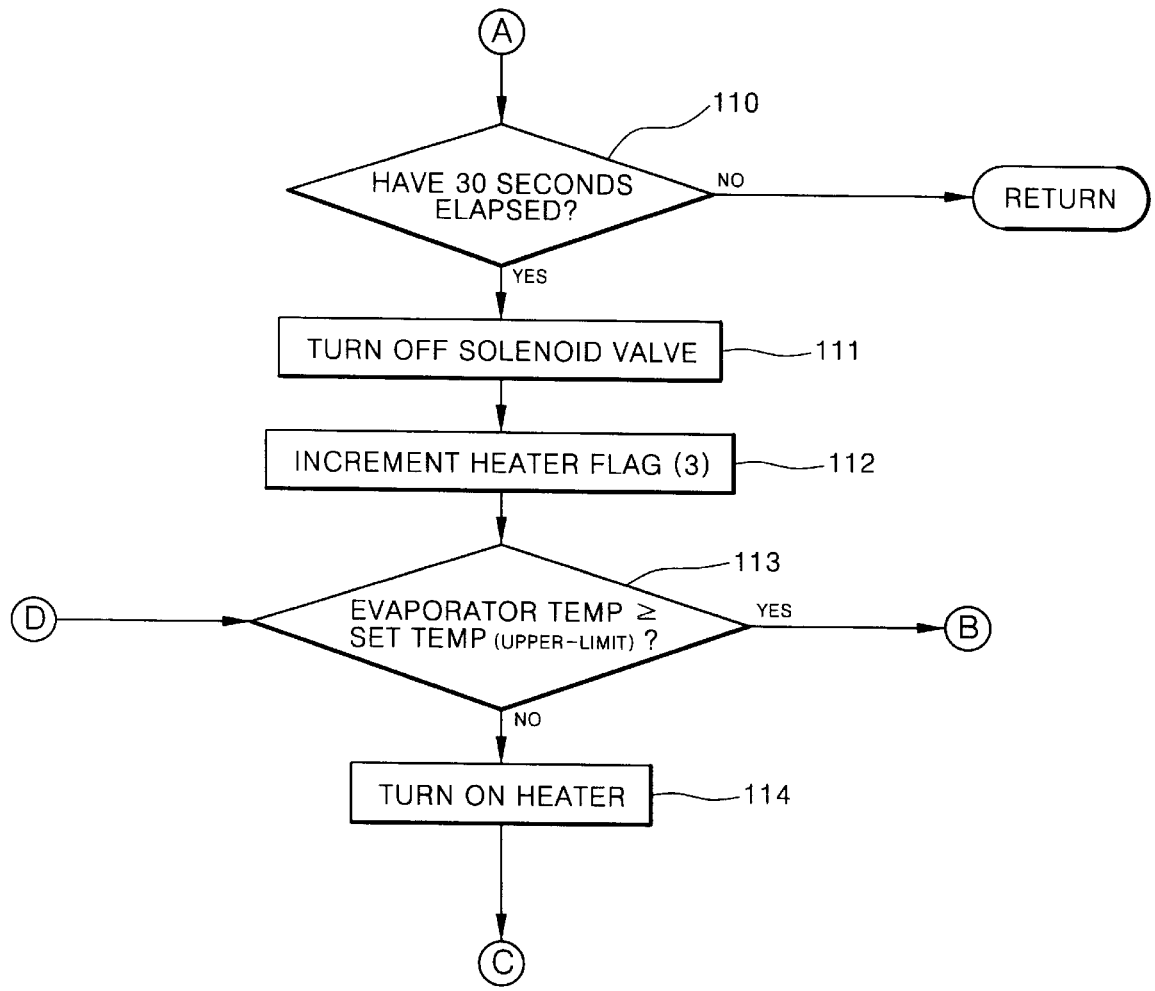
Figure 2C:
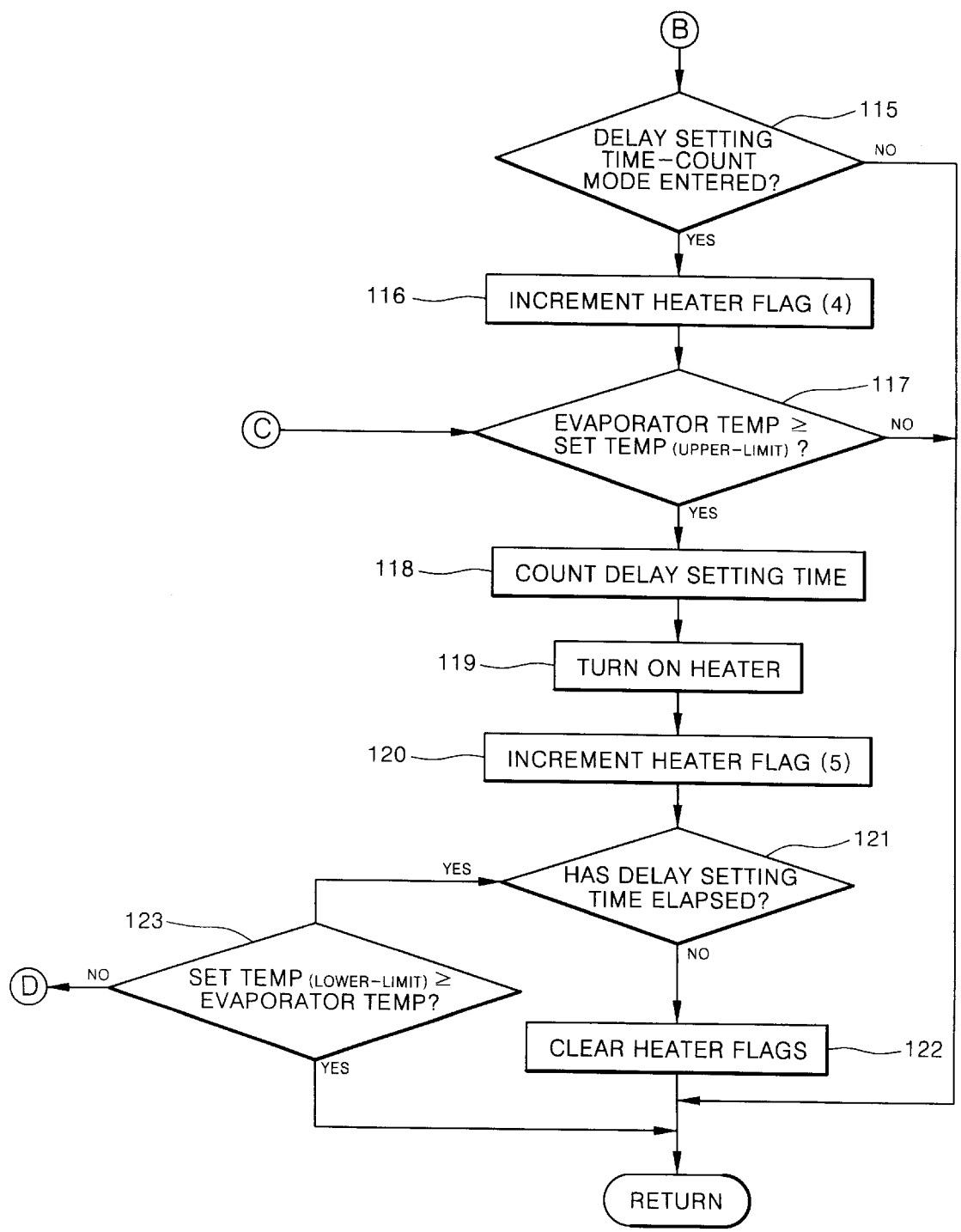

The heating routine of the microprocessor 10 will now be described in detail, with reference to FIG. 2.

At step 101, the microprocessor 10 checks a heater flag indicative of the load states of a heater (the first or second heater 13 or 14 shown in FIG. 1, and corresponding to one of a plurality of chambers). There are five increments (stages) of the heater flag, representing the operations of a compressor check, followed by three chamber checking operations, and then a predetermined delay time check, to thereby control the system in five stages, such that the load state changes with each increment of the flag.

Figure 3A:
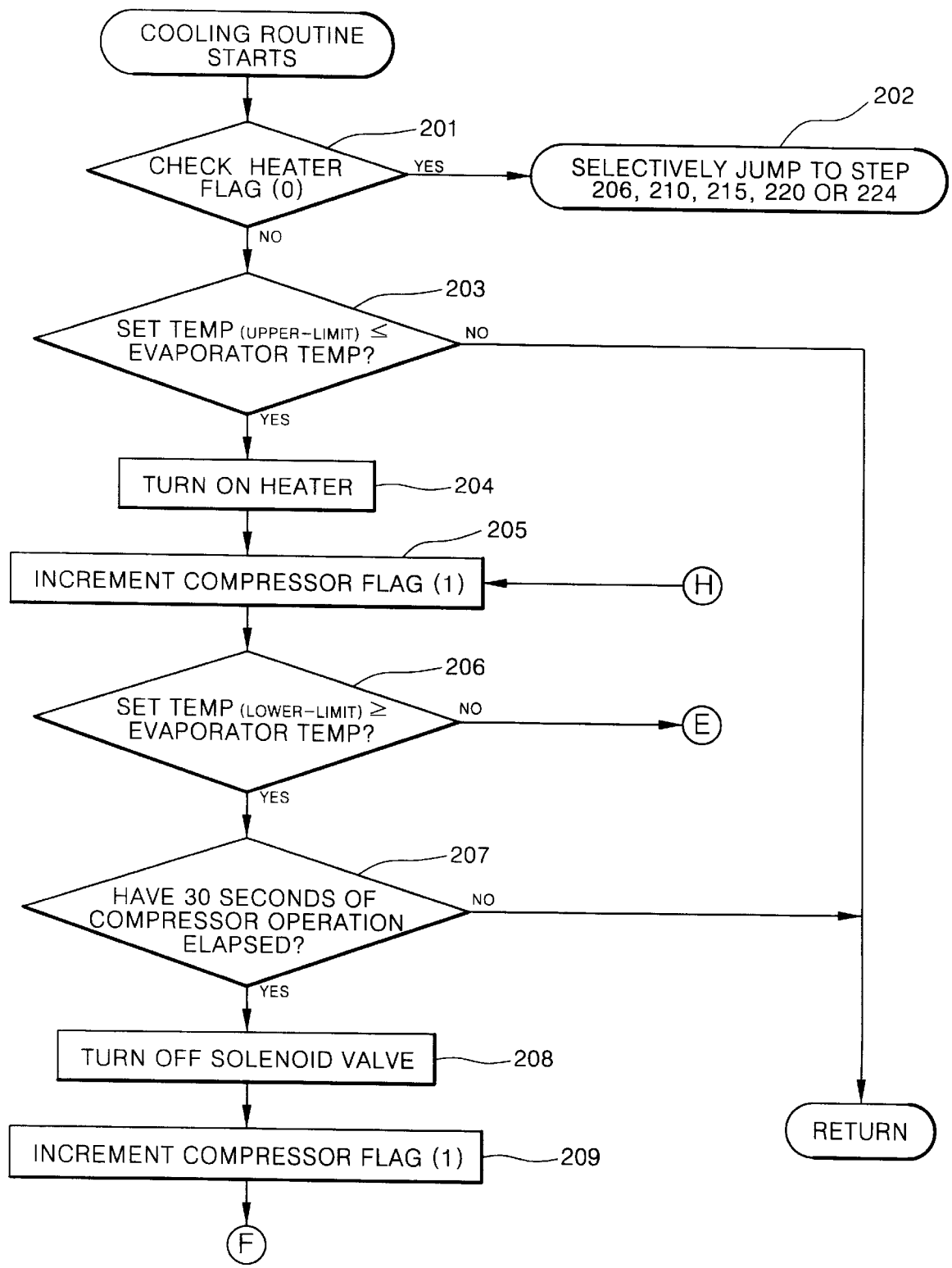
FIG. 3 is a flow chart illustrating a refrigerating control operation of the control portion corresponding to one chamber for fermenting and storing kimchi according to the present invention.
Figure 3B:
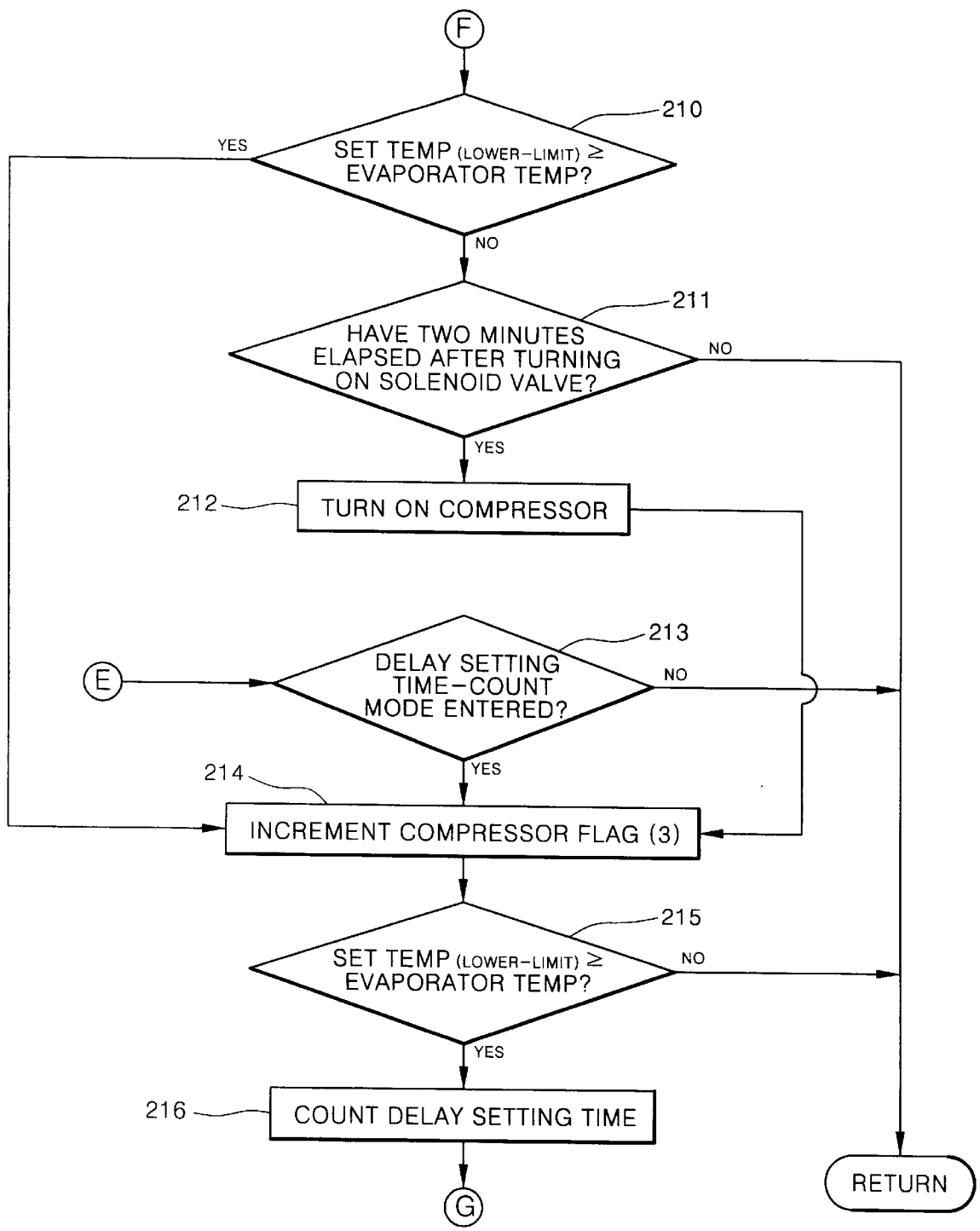
Figure 3C:
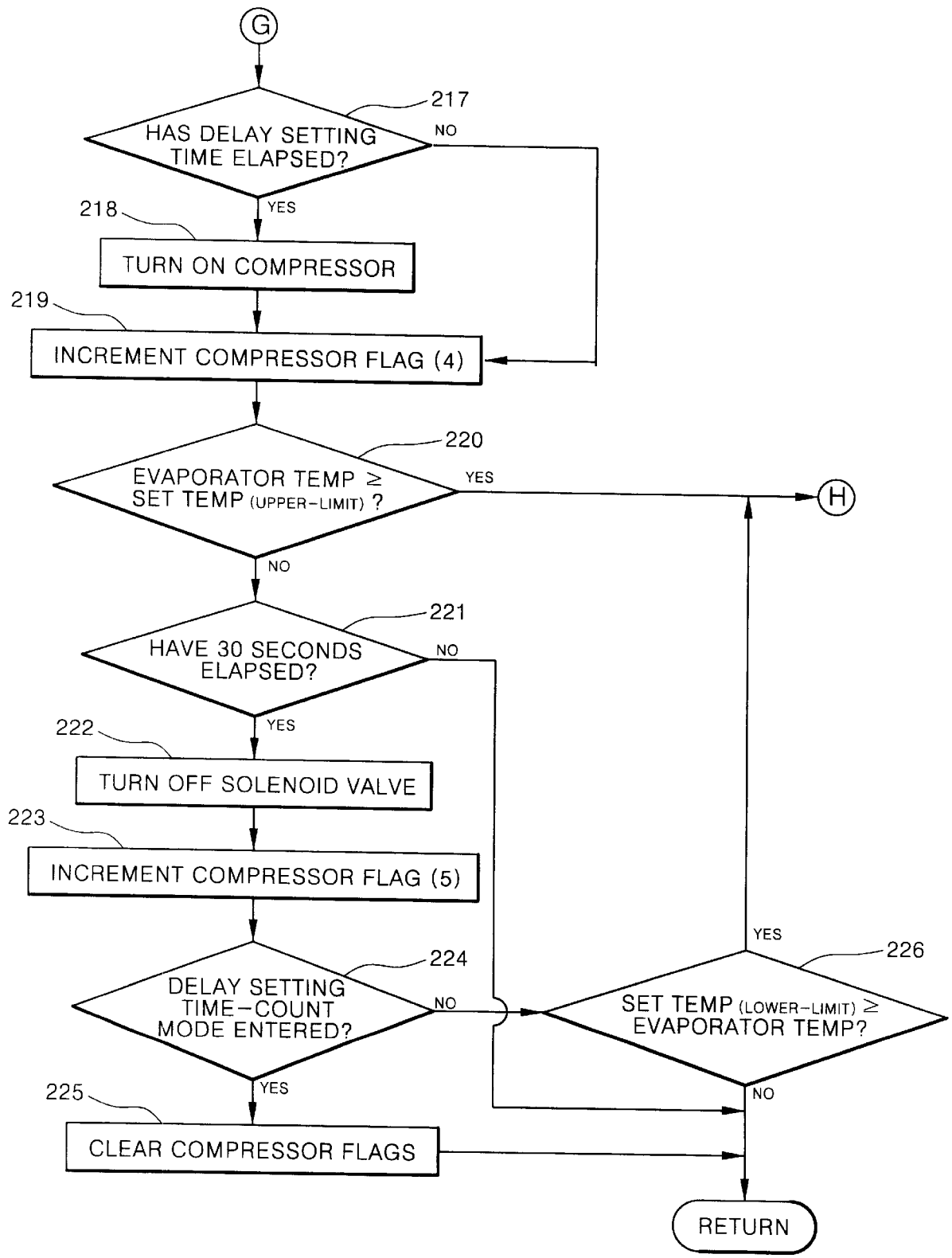

If the heater flag exists at step 101, the heating routine proceeds to step 102 to determine the status of the heater flag. Based on this determination, one of steps 106, 109, 113, 117 and 121 is executed by the microprocessor 10. If the heater flag is not set, step 103 compares the lower-limit temperature with the temperature of the evaporator. If the lowest setting temperature is lower than the evaporator temperature, step 104 is executed to perform a cooling routine. Meanwhile, step 203 determines whether the evaporator temperature is higher than a highest setting temperature (as described below with respect to FIG. 3 and the cooling routine) and the routine of the microprocessor returns if the upper-limit temperature is higher than (or equal to) the evaporator temperature. Thus, the operating cycle is repeated. If the lower-limit temperature is higher than that of the evaporator at step 103, step 105 is executed, whereby the heater flag is incremented and the chamber load state enters a suspending time period to maintain the chamber temperature at the set temperature region.

Step 106 determines whether the compressor is turned off. If the compressor is to be turned on, step 108 is executed to increment the heater flag. On the contrary, if the compressor is to be turned off, step 107 is executed to turn off the compressor. If the compressor is not under the condition of being turned off, the cooling routine is performed corresponding to another chamber.

Step 109 compares the evaporator temperature with the upper limit of the set temperature region. If the evaporator temperature is lower than the upper limit of the set temperature region, step 110 is executed to turn off the compressor after the elapse of 30 seconds. If the evaporator temperature is higher than (or equal to) the upper-limit temperature, step 115 is executed to determine whether the delay setting time-count mode has been entered. If 30 seconds have not yet elapsed, the routine of the microprocessor 10 returns; otherwise, step 111 is executed to turn off the first or second solenoid valve 11 or 12 and thereby stop the operation of the corresponding evaporator, whereupon, in step 112, the heater flag is incremented.

With the evaporator turned off, step 113 again compares the evaporator temperature with the upper-limit of the set temperature region. If the evaporator temperature is higher than (or equal to) the upper-limit temperature, step 115 is executed otherwise, the first or second heater 13 or 14 is turned on in step 114. Next, the evaporator temperature is again compared with the upper limit of the set temperature region. Accordingly, if the evaporator temperature goes above the upper limit of the set temperature region, which is detected in steps 109 and 113, step 115 is executed to determine whether the delay setting time-count mode has been entered.

If the delay setting time-count mode has been entered, the heater flag is incremented in step 116 and step 117 is executed to yet again compare the evaporator temperature with the upper limit of the set temperature region. If the evaporator temperature is lower than the upper-limit temperature, the routine of the microprocessor 100 returns.

If the evaporator temperature is higher than (or equal to) the upper limit of the set temperature region, step 118 is executed to begin counting a delay setting time representing a suspending period having a time interval of about 10 to 40 minutes. At the same time, step 119 turns off corresponding heater and step 120 increments the heater flag.

It is determined at step 121 whether the delay setting time has elapsed. Once the delay setting time count is completed, step 122 clears the heater flags and the routine of the microprocessor 10 returns. If the delay setting time counting is proceeding, step 123 is executed to compare the evaporator temperature with the lower limit of the set temperature region. If the evaporator temperature is lower than the lower-limit temperature, step 113 is executed again to compare the evaporator temperature with the upper-limit temperature and the routine repeats step 114 or 115. On the other hand, if the evaporator temperature is higher than (or equal to) the lower-limit temperature, the microprocessor routine returns, whereupon steps 101 and 103 are sequentially executed again.

Now, the cooling routine, whereby the compressor is operated while at least one of the solenoid valves 11 and 12 is turned on to cool the corresponding chamber, will be described in detail.

At step 201, the microprocessor 10 checks a compressor flag indicative of the load state of the compressor 6. There are five increments (stages) of the compressor flag, representing the operations of a compressor check, followed by three chamber temperature checking operations, and then a predetermined delay time check, to thereby control the system in five stages, such that the load state changes with each increment of the flag.

If the compressor flag exists at step 201, the cooling routine proceeds to step 202 to determine the state of the loads. Based on this determination, any one of steps 206, 210, 215, 220 and 224 is executed by the microprocessor 10. If the compressor flag is not set, step 203 is executed to compare the upper limit of the set temperature region with that of the evaporator, and if the upper-limit temperature is higher, the routine returns and the compressor is determined to be in the suspending state.

If, on the other hand, the upper-limit temperature is determined to be lower than (or equal to) the evaporator temperature in step 203, step 204 turns off the corresponding heater and the compressor flag incremented in step 205. Step 206 is then executed to compare the lower limit of the set temperature region with the evaporator temperature. If the lower-limit temperature is higher than (or equal to) the evaporator temperature, step 207 is executed to determine whether 30 seconds of compressor operation have elapsed. Once 30 seconds have elapsed, step 208 turns corresponding solenoid valve and step 209 increments the compressor flag; otherwise, the routine returns. Subsequently, step 210 determines whether the lower limit of the set temperature region is higher than (or equal to) thus evaporator temperature, and if so, step 214 is executed; otherwise, step 211 is executed to determine whether two minutes have elapsed after turning of the solenoid valve. If two minutes have not elapsed, the routine returns, but if so, step 212 turns on the compressor and step 214 for flag increment is executed.

On the other hand, if the lower-limit temperature is higher than the evaporator's at step 206, step 213 is executed to determine whether a delay setting time-counter mode is to be performed. If the delay setting time-count mode is not entered, the routine of the microprocessor 10 returns, but if this mode is entered, the compressor flag is incremented.

Step 215 compares the evaporator temperature with the lower limit of the set temperature region. If the lower-limit temperature is lower than (or equal to) the evaporator's, the routine returns. If the lower-limit temperature is higher than the evaporator's, step 216 begins counting the delay setting time. At the same time, step 217 is executed to determine whether the delay setting time has elapsed and then to turn off the compressor in step 218; otherwise, step 219 is executed to increment the compressor flag. At this time, if the compressor is turned on, the compressor is operating an evaporator corresponding to another chamber.

Thereafter, step 220 compares the evaporator temperature with the upper-limit temperature. If the evaporator temperature is higher (or equal to) the upper-limit temperature, the compressor flag is incremented in step 205 and steps 206 to 212 are executed again in order to lower the chamber temperature.

On the contrary, if the evaporator temperature is lower than the upper-limit temperature, step 221 is executed to determine whether 30 seconds have elapsed after turning off the compressor. If 30 seconds have not yet elapsed, the routine returns. If 30 seconds have elapsed, step 222 opens (turns off) the solenoid valve 11 or 12 and the compressor flag is incremented in step 223.

Step 224 determines again whether the delay setting time-count mode is entered. If the delay setting time-count mode is entered, a system malfunction is determined, which clears the compressor flags in step 225, and the routine returns. If the delay setting time-count mode is not entered, step 226 is re-executed to determine whether the evaporator temperature is higher than (or equal to) the upper-limit temperature, and if so, the chamber temperature is lowered, after incrementing the compressor flag is step 205, as described above in connection with steps 206 to 212; otherwise, the system routine returns.

As described above, the method for controlling the operation of a refrigerator including plural chambers for fermenting and storing kimchi enables the control of operation loads corresponding to each chamber, thereby removing adverse effects on the taste of various kimchi types and enabling the effective control of loads while preventing system overload kimchi due to the operation of plural chambers, to accomplish the effective operation of kimchi refrigerator.

What is claimed is:

1. A method for controlling the operation of a refrigerator having plural chambers sharing a compressor, each chamber including system loads constituted by a heater and refrigeration cycling means comprising the compressor, an evaporator and a solenoid valve, and containing kimchi to be fermented and stored, said method comprising the steps of:

reading a user programming signal input via a key inputting portion, the user programming signal representing any one of at least two predetermined temperature regions for any one chamber and a kimchi type and taste, to determine a matrix combination;

determining a total fermentation time including a lactobacillus increasing time period and a lactobacillus reducing time period corresponding to the temperature region of the determined matrix combination;

determining a fixed time and a changeable setting time for controlling a fermentation operation selectively performed by a heating routine and a cooling routine in any one chamber by the heater and the refrigeration cycling means, respectively, the changeable setting time including a suspending time;

selecting either one of the heating and cooling routines according to a chamber temperature state determined by sampling the evaporator temperature;

controlling the operation of the system loads based on the selected routine throughout the total fermentation time, to ferment the contained kimchi according to the matrix combination; and storing the fermented kimchi after the suspending time has elapsed, by restarting the system loads constituted by the refrigeration cycling means.

2. The method as claimed in claim 1, wherein the suspending time is included in the lactobacillus reducing time period, to force a chamber temperature to correspond to the temperature of kimchi contained in the chamber.

3. The method as claimed in claim 2, wherein the suspending time is at least five hours to allow the chamber temperature at a higher temperature region of the any one of at least two predetermined temperature regions to reach a storing temperature region.

4. The method as claimed in claim 2, wherein the suspending time is at least two hours to allow the chamber temperature at a lower temperature region of the any one of at least two predetermined temperature regions to reach a storing temperature region.

5. The method as claimed in claim 1, wherein the heating routine includes steps of:

activating the heater at the lowest temperature of the any one of at least two predetermined fermentation temperature regions; deactivating the heater at the highest temperature of the any one of at least two predetermined temperature regions;

delaying the operating of the loads for a predetermined time period when the chamber temperature reaches the highest temperature and subsequently confirming the stopping of the compressor; and closing the solenoid valve connected to the evaporator and ending the heating routine for the corresponding chamber after a delay setting time period expires.

6. The method as claimed in claim 1, wherein the cooling routine includes steps of:

deactivating the heater;

activating the compressor at the highest temperature of the any one of at least two predetermined temperature regions;

opening the solenoid valve connected to the evaporator; deactivating the compressor and closing the solenoid valve connected to the evaporator for a delay setting time period, when the chamber temperature reaches the lowest temperature of the any one of at least two predetermined temperature regions; and ending the cooling routine after the delay setting time period expires.

7. The method as claimed in claim 6, further comprising the step of:

determining whether the compressor is to be turned off before said compressor deactivating step, based on the sampled evaporator temperature; and performing the cooling routine anew, if the evaporator temperature is higher than the highest setting temperature of the any one of at least two predetermined temperature regions.

8. The method as claimed in claim 5, wherein the delay setting time period is 40 minutes.

9. The method as claimed in claim 6, wherein the delay setting time period is 40 minutes.

* * * * *